(12) United States Patent
Vieira (10) Patent No.: US 9,258,132 B2
(45) Date of Patent: Feb. 9, 2016

(54) NETCONF SNMP GATEWAY

(71) Applicant: Alcatel-Lucent Canada, Inc., Ottawa (CA)

(72) Inventor: Elvis M. Vieira, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 343 days.

(21) Appl. No.: 13/911,625

(22) Filed: Jun. 6, 2013

(65) Prior Publication Data

US 2014/0365621 A1    Dec. 11, 2014

(51) Int. Cl.
  *G06F 15/16*    (2006.01)
  *H04L 12/18*    (2006.01)
  *H04L 12/24*    (2006.01)

(52) U.S. Cl.
  CPC .............. *H04L 12/18* (2013.01); *H04L 41/022* (2013.01); *H04L 41/0213* (2013.01); *H04L 41/0226* (2013.01); *H04L 41/0893* (2013.01); *H04L 41/046* (2013.01)

(58) Field of Classification Search
  USPC ......... 709/217, 219, 223, 230, 236, 245, 246, 709/250
  See application file for complete search history.

(56) References Cited

U.S. PATENT DOCUMENTS

| 7,316,022 | B2 * | 1/2008 | Nishio .......................... 719/321 |
| 8,417,688 | B2 * | 4/2013 | Abbondanzio et al. ........ 707/713 |
| 2006/0168229 | A1 * | 7/2006 | Shim et al. ..................... 709/226 |
| 2007/0186011 | A1 * | 8/2007 | Batke et al. .................... 709/246 |
| 2010/0162205 | A1 * | 6/2010 | Clemm et al. ................. 717/106 |

* cited by examiner

*Primary Examiner* — Viet Vu
(74) *Attorney, Agent, or Firm* — Kramer & Amado, P.C.

(57) ABSTRACT

Various exemplary embodiments relate to a network configuration protocol (NETCONF) and simple network management protocol (SNMP) gateway (NSG). The NSG may include: a first interface configured as a NETCONF server, the first interface configured to connect to a NETCONF client and receive NETCONF messages, at least one NETCONF message identifying a managed object; a buffer configured to store the identified managed object; and a second interface configured to send an SNMP message to an SNMP agent, the SNMP message including the managed object stored in the buffer. Various exemplary embodiments relate to a method performed by a network gateway, the method comprising: receiving a NETCONF message from a NETCONF client; translating the NETCONF message into a SNMP message; and sending the SNMP message to a configurable node.

20 Claims, 4 Drawing Sheets

NETCONF SNMP GATEWAY

TECHNICAL FIELD

Various exemplary embodiments disclosed herein relate generally to communications networks.

BACKGROUND

Simple Network Management Protocol (SNMP) is a well known protocol for managing networks. SNMP is a stateless protocol, meaning it does not need to keep the communications state with a remote node. SNMP messages may be sent asynchronously via user datagram protocol (UDP). This enables an SNMP server to send multiple messages and perform other actions while waiting for a response. The SNMP server may listen for SNMP reply messages or SNMP traps.

SNMP uses a binary-encoding following basic encoding rules (BER). The binary encoding provides for a smaller packet size and therefore greater throughput. However, the BER is difficult for some users because it is not easily human readable.

The network configuration protocol (NETCONF) is a more recent protocol developed to provide a text-based configuration. NETCONF is a session-based protocol that uses extensible markup language (XML) based data encoding. Accordingly, NETCONF messages are generally more easily read by human operators. However, the XML based data encoding requires a larger packet size and may reduce throughput. Furthermore, in large networks, NETCONF becomes resource intensive as large portions of memory become necessary to keep connection states.

SUMMARY

In view of the foregoing, it would be desirable to provide a system utilizing a convenient text-based system of NETCONF while preserving the scalability and efficiency of SNMP. In particular, it would be desirable to provide a system enabling NETCONF clients to interact with SNMP agents such that minimal alteration of the NETCONF clients and SNMP agents is required.

In light of the present need for compatibility between NETCONF and SNMP, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a network configuration protocol (NETCONF) and simple network management protocol (SNMP) gateway (NSG). The NSG may include: a first interface configured as a NETCONF server, the first interface configured to connect to a NETCONF client and receive NETCONF messages, at least one NETCONF message identifying a managed object; a buffer configured to store the identified managed object; and a second interface configured to send an SNMP message to an SNMP agent, the SNMP message including the managed object stored in the buffer.

In various embodiments, the buffer includes an entry for a NETCONF datastore, wherein the NSG is configured to: clear the entry based on receipt of a lock NETCONF message; add managed objects to the entry based on receipt of a configuration NETCONF message; and send the managed objects to the SNMP agent via the second interface responsive to an unlock NETCONF message.

In various embodiments, the NSG further includes a multicast datastore configured to store a record of a multicast group including a context-list of configurable nodes In various embodiments, the context-list is stored in a configurable multicast-control datastore and the context-list includes a list of addresses of the configurable nodes. The NSG may also include a candidate datastore corresponding to each of the configurable nodes. The NSG may be configured to: receive, via the first interface, a NETCONF configuration message indicating a change to the multicast datastore; update the multicast datastore based on the configuration message; and send a plurality of SNMP messages to the configurable nodes based on the multicast datastore.

In various embodiments, the at least one NETCONF message includes a get operation and the SNMP message is an SNMP get message requesting managed object information from the SNMP agent. The NSG may further include a multicast datastore configured to store a record of a multicast group including a context-list of configurable nodes, the SNMP get message is sent to a plurality the configurable nodes, wherein the NSG is further configured to send a reply message to the NETCONF client including a plurality of node-list elements including the managed object information of a respective configurable node.

Various exemplary embodiments relate to a method performed by a network gateway, the method comprising: receiving a NETCONF message from a NETCONF client; translating the NETCONF message into a SNMP message; and sending the SNMP message to a configurable node.

In various embodiments, the NETCONF message includes a get operation and the step of translating comprises translating the get operation into an SNMP get request and the method further includes: receiving an SNMP reply message including configuration information; translating the SNMP reply message into a NETCONF reply message including the configuration information; and sending the NETCONF reply message to the NETCONF client.

The get operation may request a list of event streams, and the method may further include: responding to the NETCONF client with a list of event streams including an SNMP event stream; receiving a NETCONF subscription request from the NETCONF client identifying the SNMP event stream; storing a NETCONF subscription in association with the SNMP agent; receiving an SNMP trap message from the SNMP agent; translating the SNMP trap message to a NETCONF notification message; and sending the NETCONF notification message to the NETCONF client. The method may further include: receiving a NETCONF close session request matching a NETCONF subscription; deleting the NETCONF subscription; and sending a NETCONF reply.

In various embodiments, the list of event streams further includes a Message Queuing Telemetry Transport (MQTT) event stream, and the method further includes: receiving a NETCONF subscription request from the NETCONF client identifying the MQTT event stream; storing a NETCONF subscription in association with the configurable node; receiving an MQTT message from the configurable node implementing a MQTT stack; translating the MQTT message to a NETCONF notification message; and sending the NETCONF notification message to the NETCONF client.

In various embodiments, the NETCONF message is a configuration operation including a managed object for a target datastore, wherein the step of translating includes: receiving a NETCONF lock request for the target datastore; storing the managed object; receiving a NETCONF unlock request for the target datastore; generating an SNMP set request including the managed object; and sending the SNMP set request to the configurable node.

Various exemplary embodiments relate to a system including: a first NETCONF client; a first SNMP agent; a NETCONF SNMP gateway (NSG) configured to receive NETCONF commands from the first NETCONF client and translate the NETCONF commands to SNMP messages.

In various embodiments, the NSG includes: an operation buffer configured to act as a NETCONF datastore and store NETCONF operations on the NETCONF datastore received from the first NETCONF client; and the NSG is configured to translate the stored NETCONF operations into an SNMP message.

In various embodiments, the system further includes: a plurality of SNMP agents, wherein the NSG is configured to: receive NETCONF requests; determine the desired SNMP agent; and transparently forward the translated SNMP message to the desired SNMP agent In various embodiments, the system further includes: a plurality of SNMP agents, wherein the NSG includes: a multicast control datastore including a context list of IP addresses of a plurality of nodes; and a multicast datastore, including a reference to the context list and a plurality of configuration objects that are common to the nodes in the context list, wherein the NSG is configured to: receive a NETCONF message indicating a context list; and generate a SNMP message for each node on the context list based on the configuration objects in the multicast datastore.

In various embodiments, the NETCONF client is configured to send a configuration request targeting the multicast control datastore and the NSG is configured to add or delete an IP address from the context list responsive to the configuration request.

In various embodiments, the NSG is further configured to: receive a response from a plurality of the SNMP agents and generate a NETCONF response including a plurality of node-list elements corresponding to the respective SNMP agents.

It should be apparent that, in this manner, various exemplary embodiments enable a network gateway providing translation between NETCONF and SNMP nodes. In particular, by providing a gateway that acts as a NETCONF server, a NETCONF client may be used to configure and receive notifications of SNMP agents.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
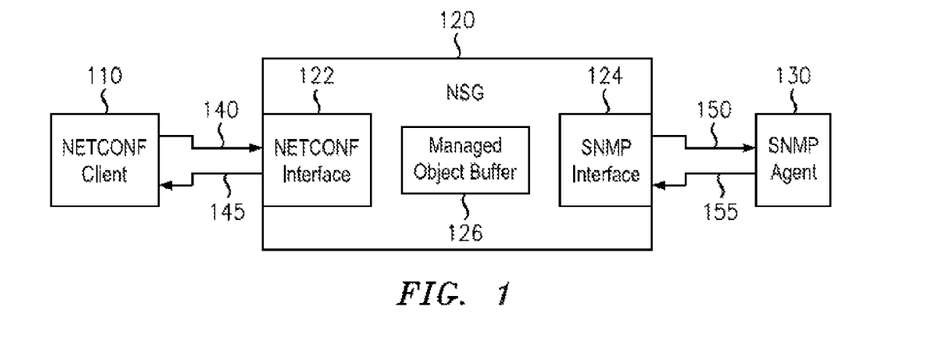
FIG. 1 illustrates an exemplary communications network.

FIG. 1 illustrates an exemplary communications network 100. Communications network 100 may include a NETCONF client 110, a NETCONF SNMP gateway (NSG) 120, and an SNMP agent 130. NETCONF client 110 and NSG 120 may communicate with NETCONF messages 140 and 145. NSG and SNMP agent 130 may communicate with SNMP messages 150 and 155. It should be appreciated that a plurality of messages 140, 145, 150, 155 may be sent between NETCONF client 110, NSG 120, and SNMP agent 130.

NETCONF client 110 may be any network device configured to send and receive NETCONF messages. In various embodiments, NETCONF client 110 may be a network management server such as a service aware manager configured to enable a network operator to manage a plurality of network nodes forming an IP core network.

NSG 120 may be a network device such as a server configured to translate NETCONF and SNMP messages. NSG 120 may be configured as a proxy SNMP notification or trap destination for one or more SNMP agents 130. Accordingly, NSG 120 may appear to a NETCONF client 110 as a NETCONF server performing NETCONF operations on an SNMP agent 130. NSG 120 may include a NETCONF interface 122, a SNMP interface 124, and a managed object (MO) buffer 126.

NETCONF interface 122 may include hardware and/or instructions encoded on a machine-readable storage medium executable by a processor configured to send and receive messages according to the NETCONF protocol. The NETCONF interface 122 may establish a session with a NETCONF client 110. The NETCONF interface 122 may be configured to read NETCONF notifications in the MO Buffer 126 and send NETCONF notifications to NETCONF client 110.

SNMP interface 124 may include hardware and/or instructions encoded on a machine-readable storage medium executable by a processor configured to send and receive messages according to SNMP. The SNMP interface 124 may be configured to read managed objects or other data elements from the MO buffer 126 and encode the objects according to the SNMP BER encoding rules. The SNMP interface 124 may also be configured to receive and decode SNMP messages to extract SNMP notifications and store them in the MO Buffer 126.

MO buffer 126 may be a machine-readable storage medium configured to temporarily store configuration data. As will be described in further detail below, the MO buffer 126 may be used to temporarily store data regarding managed objects. An entry in MO buffer 126 may be opened when NSG 120 receives a lock operation. The contents of the entry may be sent to SNMP agent 130 when NSG 120 receives an unlock operation. A entry in the MO Buffer 126 can also be created when NSG 120 receives a SNMP notification or trap. Upon translation of the SNMP notification or trap to a NETCONF notification, the NETCONF notification can be sent to NETCONF Client 110.

SNMP agent 130 may be any network device configured to send and receive SNMP messages. SNMP agent may include a variety of network components such as routers, policy servers, and databases. In various embodiments, SNMP agent 130 may be further configured to use the Message Queuing Telemetry Transport (MQTT) protocol for Machine-to-Machine applications.

Message 140 may be a NETCONF message from NETCONF client 110 to NSG 120. Message 140 may be a NETCONF operation requesting an action to be performed on a datastore such as, for example, the <running/> datastore. For example, message 140 may include a NETCONF operation such as <get>, <get-config>, <edit-config>, <copy-config>, <delete-config>, <lock>, <unlock>, <close-session>, and <kill-session>.

Message 145 may be a NETCONF message from NSG 120 to NETCONF client 110. Message 145 may be a NETCONF reply message to a message 140. For example, message 145 may indicate the status of an operation, such as <ok/>. NSG 120 may send a message 145 indicating an ok status in response to every message 140 received at NSG 120. Message 145 may also be a NETCONF notification. As will be described in further detail below, NETCONF client 110 may subscribe to notifications from NSG 120. NSG 120 may provide a notification message 145 to NETCONF client 110 including the contents requested based on the subscription. Message 145 may also be a NETCONF response to an operation. For example, NSG 120 may provide a message including content in response to operations such as <get> and <get-config>.

Message 150 may be an SNMP message from NSG 120 to SNMP agent 130. For example, message 150 may be an SNMP set message including managed objects edited by the NETCONF client 110.

Message 155 may be an SNMP message from SNMP agent 130 to NSG 120. For example, message 155 may be response to message 150. In various embodiments, message 155 may be a SNMP Trap message or an SNMP notification message. SNMP agent 130 may push message 155 to NSG 120 based on, for example, an event occurring at SNMP agent 130.

Figure 2:
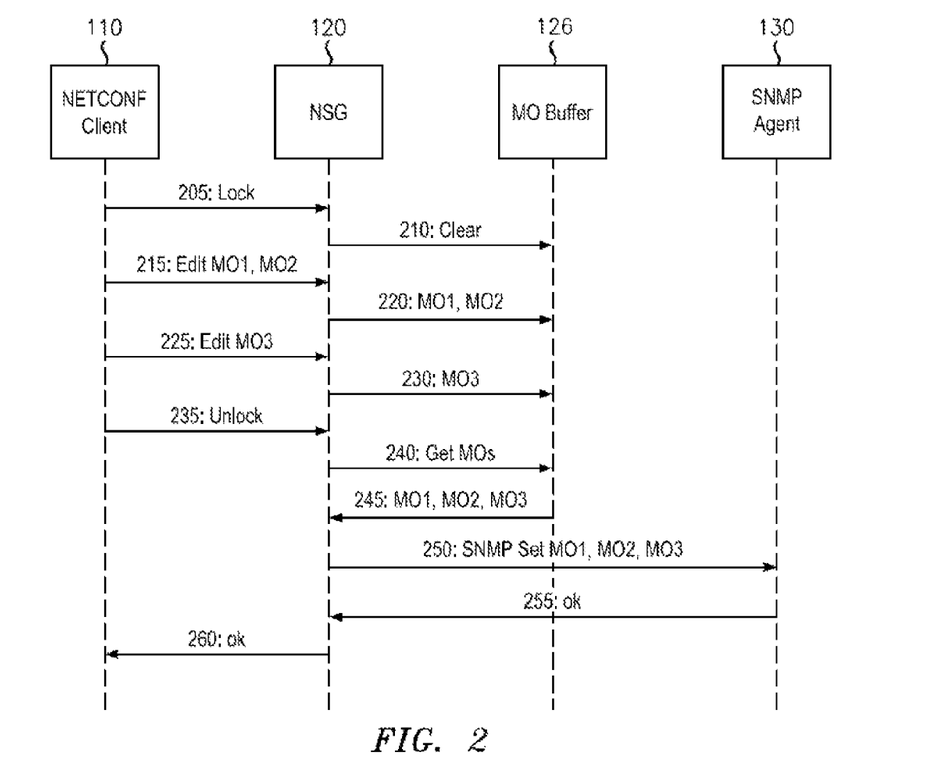
FIG. 2 illustrates a message passing diagram showing an exemplary method of using a NETCONF SNMP gateway.

FIG. 2 illustrates a message flow diagram showing an exemplary method 200 of using NSG 120. Message passing diagram 200 may illustrate messages sent between NETCONF client 110, NSG 120, MO buffer 126, and SNMP agent 130. It should be apparent that each message shown in FIG. 2 is sent from one element and received by another element. Accordingly, each message shown in FIG. 2 may illustrate a step of sending and a step of receiving. The following table illustrates exemplary NETCONF messages that may be used in the message flow diagram in FIG. 2.

```
<rpc message-id="101"
    xmlns="urn:ietf:params:xml:ns:netconf:base:1.0">
  <lock>
    <target><running/></target>
  </lock>
</rpc>
# server returns <ok/> status
<rpc message-id="103"
    xmlns="urn:ietf:params:xml:ns:netconf:base:1.0">
  <edit-config>
    <target><running/></target>
    <default-operation>none</default-operation>
    <test-option>test-then-set</test-option>
    <error-option>stop-on-error</error-option>
    <nc:config
       xmlns:nc="urn:ietf:params:xml:ns:netconf:base:1.0"
       xmlns="uri-for-my-data-model-namespace">
    <some-existing-node>
      <my-new-node nc:operation="create">
        <my-new-leaf>7</my-new-leaf>
      </my-new-node>
    </some-existing-node>
    </nc:config>
  </edit-config>
</rpc>
```

-continued

```
# server returns <ok/> status
<rpc message-id="106"
    xmlns="urn:ietf:params:xml:ns:netconf:base:1.0">
  <unlock>
    <target><running/></target>
  </unlock>
</rpc>
# server returns <ok/> status
```

Message 205 may be a lock operation sent by NETCONF client 110 to NSG 120. The message 205 may indicate that the NETCONF client 110 seeks to perform operations on a datastore on a NETCONF server without another NETCONF client operating on the same datastore. The NETCONF message 205 may indicate the datastore as a target datastore.

Message 210 may be a command sent by NSG 120 to the MO buffer 126 indicating that the MO buffer should clear an entry in the datastore associated with the SNMP agent. MO buffer 126 may delete the contents of any datastore entry associated with the SNMP agent. If a datastore entry associated with the SNMP agent does not already exist, the MO buffer 126 may create a new buffer entry.

Message 215 may be a NETCONF message such as an <edit-config> operation indicating one or more managed objects to be edited. The managed object may be a representation of manageable property of the configurable node where the SNMP agent 130 resides. In various embodiments, the managed objects may be database entries, routing tables, event triggers, or other network configuration parameters. In the example shown in FIG. 2, the operation may edit two managed objects, MO1 and MO2.

Message 220 may be a command sent by NSG 120 to the MO buffer 126 to store the received managed objects. MO buffer 126 may store the managed objects, for example MO1 and MO2, in the datastore entry associated with the SNMP agent 130.

Message 225 may be another NETCONF message sent by NETCONF client 110 to NSG 120 indicating one or more managed objects to be edited. The managed objects may be the same or different than the managed objects indicated in message 215. For example, FIG. 2 illustrates receipt of managed object MO3.

Message 230 may be a command sent from NSG 120 to MO buffer 126 to store the received managed object. Because NETCONF client 110 has not released the lock on the target datastore, no other NETCONF client may have edited the managed objects in MO buffer 126 and serialized NETCONF messages may be used. In various embodiments, NSG 120 may determine whether a managed object included in a second message such as message 225 affects a managed object stored in MO buffer 126. If the received managed object is a new managed object, the new managed object may be added to MO buffer 126. If the received managed object is the same as a previously received managed object, the stored managed object may be updated.

Message 235 may be a NETCONF message sent from NETCONF client 110 to NSG 120. Message 235 may be an <unlock> operation indicating the same target datastore as message 205. Accordingly, message 235 may release the lock set by message 205.

Message 240 may be a request from NSG 120 to MO buffer 126 for the managed objects stored in association with the unlocked target datastore. Message 245 may be a response from MO buffer 126 including the requested managed objects.

Message 250 may be an SNMP message including the managed objects edited while the target datastore was locked. Message 250 may be an SNMP set message. As discussed above, SNMP messages may be encoded with a SNMP BER encoding. NSG 120 may generate message 250 by encoding the managed objects using the SNMP BER encoding. In other words, NSG 120 may translate one or more NETCONF messages into a properly encoded SNMP message.

Message 255 may indicate that the SNMP agent 130 has received the message 250. In various embodiments, SNMP agent 130 may not send a confirmation message 255. Instead, NSG 120 may determine that message 250 was received if no error message arrives. NSG 120 may retransmit message 255 until a confirmation message 255 is received or a certain number of failures (which is a configuration parameter of NSG 120) is reached. If no confirmation message 255 is received, a message 260 with NETCONF message with a not OK status may be sent to NETCONF client 110. If a message 255 is received with SNMP Error Status equals to 0, a message 260 may be a NETCONF ok message indicating that the message 235 was successfully received and the edits applied. Otherwise, a NETCONF message with a not OK status may be sent to NETCONF client 110.

The messages shown in FIG. 1 and FIG. 2 may also be used to perform other standard NETCONF operations. For example, NSG 120 may provide for NETCONF notification subscriptions to SNMP agent 130. The NETCONF client 110 may use a <get> operation in message 140 to get a list of event streams supported by NSG 120. The reply message 145 may include event streams available for the SNMP agent 130. Each event stream may include <name> and <description> elements. Each event stream may also include additional elements such as notification replay availability and timestamps of available notifications, each element indicated by appropriate tags. NSG 120 may provide an SNMP stream based on SNMP agent 130. In various embodiments a configurable node with SNMP agent 130 may also include, or be replaced by, a MQTT stack. Such a configurable node may provide an MQTT stream with notification replay. For example, the following table illustrates an exemplary NETCONF reply to NETCONF client 110 including available stream information.

```
<rpc-reply message-id="101"
xmlns="urn:ietf:params:xml:ns:netconf:base:1.0">
    <data>
        <netconf xmlns="urn:ietf:params:xml:ns:netmod:notification">
            <stream>
                <stream>
                    <name>SNMP</name>
                    <description>SNMP notifications</description>
                    <replaySupport>false</replaySupport>
                </stream>
            </streams>
        </netconf>
    </data>
<rpc-reply>
```

Figure 3:
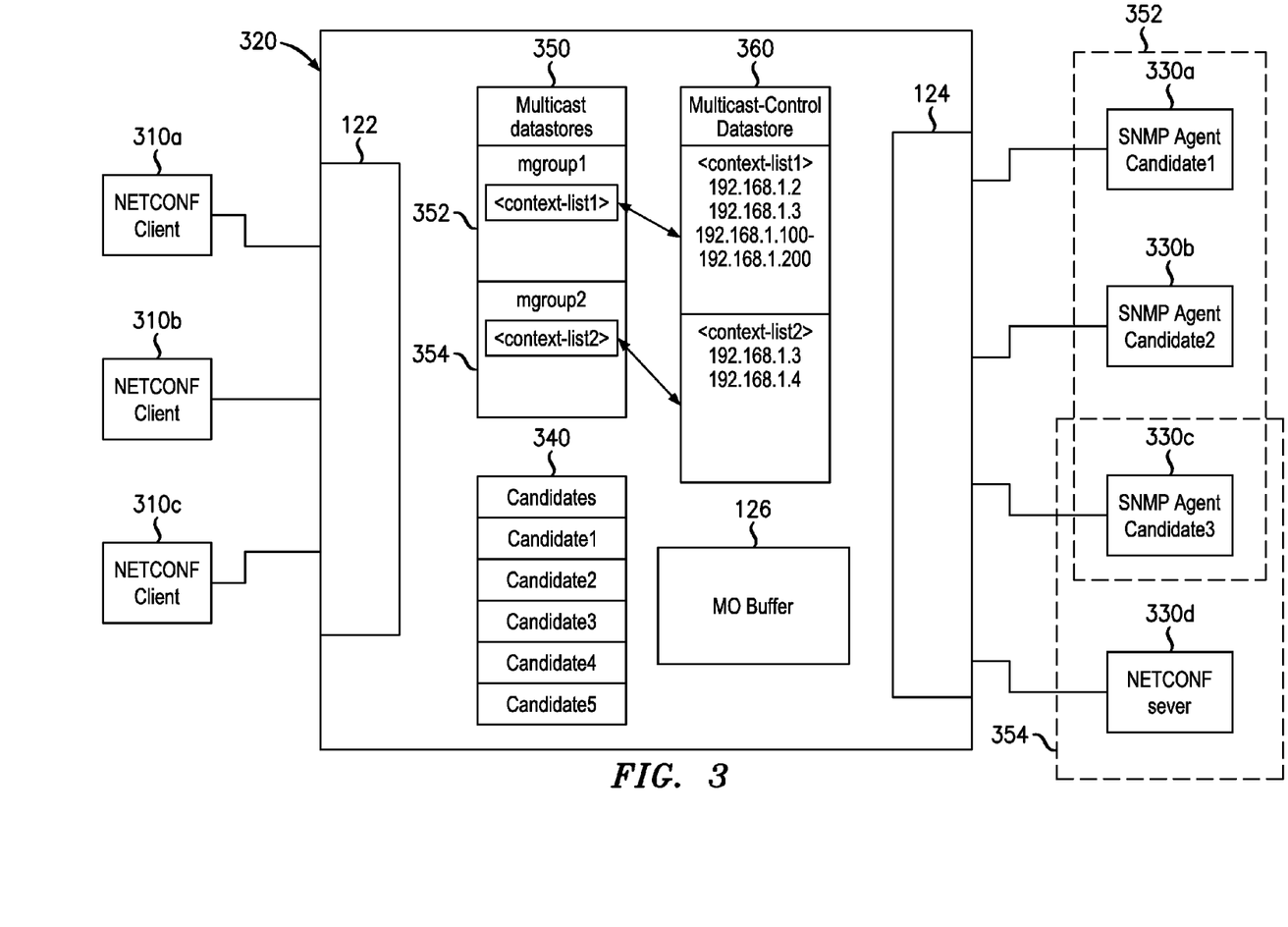
FIG. 3 illustrates another exemplary communications network.

FIG. 3 illustrates another exemplary communications network 300. Exemplary communications network 300 may include one or more NETCONF clients 310, a NSG 320, and a plurality of SNMP agents 330. FIG. 3 illustrates various extensions to NETCONF protocol. It should be appreciated that the operations and datastores described as extensions to NETCONF protocol may be given different names and that the following description is illustrative rather than limiting.

The one or more NETCONF clients 310 may be similar to NETCONF client 110. In various embodiments, NETCONF client 310 may be a standard NETCONF client. NSG 320 may act as a NETCONF router serving as a proxy for the plurality of SNMP agents 330. As described above, NSG 320 may receive NETCONF messages from a NETCONF client 310 and transparently translate the NETCONF messages to SNMP messages using MO buffer 126 or candidates datastore 340.

Candidates datastore 340 may be a datastore including information regarding each configurable node 330. Candidates datastore 340 may be an extension of the candidate datastore defined by RFC 4741, which is incorporated herein by reference. Candidates datastore 340 may include a record for each node 330. Configuration information, such as managed objects, specific to an individual node 330 may be stored in the record of candidates datastore 340 for the individual SNMP agent 330. NSG 320 may implement the <commit> and <discard-changes> operations defined for candidate datastore. The <commit> operation may cause NSG 320 to send an SNMP message to the SNMP agent 330 corresponding to the <candidate> record setting configuration options as defined by the <candidate> record. The <discard-changes> operation may revert a <candidate> record to the current running datastore configuration. In other words, the <candidate> record may be deleted without sending any SNMP messages.

Each entry in candidate datastore 340 for transparent multicast may be identified uniquely by two keys: the datastore name and the SNMP agent IP address for each node 330. Accordingly, for NSG to send a SNMP message to a SNMP agent it needs to know the datastore name and the IP address of the SNMP agent 330.

In various embodiments described in further detail below, the one or more NETCONF clients 310 may also be configured to implement extensions to the NETCONF protocol to enable NSG aware services. More specifically, the NETCONF clients 310 may implement additional NETCONF elements and operations for invoking non-transparent multicast capabilities of NSG 320. In various embodiments, network 300 may include both standard NETCONF clients 110 and multicast capable NETCONF clients 310.

Configurable nodes 330 may be network devices that may interact with other network devices in machine-to-machine (M2M) communication. For example, configurable nodes 330 may include network devices such as servers, switches, routers, and databases. Configurable nodes 330 may include SNMP agents similar to SNMP agent 130. Configurable nodes 330 may also include NETCONF servers. Configurable nodes 330 may also use MQTT for M2M communication.

As will be described in further detail below, NSG 320 may send messages to a plurality of configurable nodes 330 defined as a multicast group. For example, Multicast group mgroup1 352 may include configurable nodes 330a, 330b, and 330c. As another example, multicast group mgroup2 354 may include configurable nodes 330c and 330d. For those members of the multicast group that are SNMP agents, the NSG 320 may translate NETCONF operations into SNMP messages. For those members of the multicast group that are NETCONF servers, NSG 320 may establish a NETCONF session with the NETCONF server and send NETCONF messages by replaying received NETCONF messages and/or sending modified NETCONF messages.

The NSG 320 may be similar to NSG 120. NSG 320 may include a MO buffer 126. NSG 320 may also include one or more machine-readable storage mediums providing datastores. For example, NSG 320 may include a candidates datastore 340, one or more multicast datastores 350, and a multicast control datastore 360.

A multicast datastore 350 may be a data arrangement configured to store information common to a plurality of network nodes. A group of network nodes such as SNMP agents 330 may be defined as an mgroup. As illustrated in FIG. 3, for example, SNMP agents 330a, 330b and 330c may form mgroup1. Multicast datastore 350 may include a <context-list> element. The <context-list> element may be a pointer to a <context-list> stored in the multi-cast control datastore 360. Multicast datastore 350 may also include configuration options such as managed objects that are applicable to the nodes included on the context-list.

The multicast-control datastore 360 may be a data arrangement configured to store context-lists defining the nodes within a multicast group. The context-lists may include IP addresses or ranges of IP addresses of the configurable nodes 330. For example, the context-list for mgroup1 352 may include IP addresses 192.168.1.2, 192.168.1.3, and intervals of IP addresses such as 192.168.1.100-192.168.1.200. A NETCONF client 310 may configure the multicast-control datastore 360 using extension operations such as <minclude> and <mdelete>, which will be described in further detail below.

The NSG 320 may provide for extensions to NETCONF messages. NETCONF messages may be extended to include a <node-list> element. The <node-list> element may specify a list of IP addresses for a NETCONF operation. The IP addresses may be included as an ip attribute specifying a single IP address or an interval attribute specifying a range of IP addresses. NETCONF messages may also be extended to include a <datastore-list> element specifying one or more context-lists. The following table illustrates an exemplary <node-list> element.

```
<node-list>
    <datastore-list>
        <target><mgroup1/></target>
        <target><mgroup2/></target>
    </datastore-list>
    <node ip="192.168.1.2"/>
    <node interval="10.0.0.1-10.0.0.200"
</node-list>
```

Reply messages from NSG 320 may be extended to include <node-reply> elements. A <node-reply> element may include values of configuration objects for a specific node. A <node-reply> element may include an ip attribute for each specific node and a list of configuration content, which may be any other configuration element such as managed objects. The following table illustrates an exemplary format for a <node-reply> element.

```
<node-reply ip=ip_address>
    configuration-content
</node-reply>
```

The NSG 320 may provide extensions to NETCONF operations. New operations may be defined including an <minclude> operation and a <mremove> operation. The <minclude> operation may be used by a NETCONF client 310 to configure the multicast-control datastore 360. The <minclude> operation may include a <datastore-list> indicating the <context-lists> of which multicast datastores 350 should be updated. The <minclude> operation may also include a <node-list> indicating the nodes that should be added to the indicated <context-lists>. The <mremove> operation may be used by a NETCONF client 310 to delete nodes from a context-list in multicast-control datastore 360. The <mremove> operation may also include the <datastore-list> and <node-list> elements. The following table illustrates an exemplary NETCONF message for adding nodes to a context-list.

```
<rpc message-id="xxx"
    xmlns="urn:alcatel:params:xml:ns:netconf:base:1.0">
    <edit-config>
        <target><multicast-control/></target>
        <nc:config
            xmlns:nc="urn:alcatel-lucent:params:xml:ns:netconf:base:1.0"
            xmlns="uri-for-my-data-model-namespace">
            <minclude>
                <datastore-list>
                    <target><mgroup1/></target>
                    <target><mgroup2/></target>
                </datastore-list>
                <node-list>
                    <node ip="192.168.1.2"/>
                    <node ip="192.168.1.3"/>
                    <node interval="192.168.1.100-192.168.1.200"/>
                    <node ip="192.168.1.4"/>
                </node-list>
            </minclude>
        </nc:config>
    </edit-config>
</rpc>
```

NSG 320 may also provide for extensions to standard NETCONF operations. Any NETCONF operation may include <node-list> elements identifying a list of nodes where the NETCONF operation will take place. If no <node-list> is indicated, the NSG 320 may select nodes from the context-list of the datastore that the message is referring to, for example, the source or target of a -config operation. If no <node-list> and no datastore or only the <running/> datastore is indicated, the operation may apply to all nodes in all context lists. For example, in response to a <get> operation indicating only the <running/> datastore, NSG 320 may provide configuration information for all available nodes. The following table illustrates an exemplary NETCONF message using a <node-list> to request configuration information for a plurality of nodes.

```
<rpc message-id="101"
    xmlns="urn:ietf:params:xml:ns:netconf:base:1.0">
    <get-config>
        <source>
            <mgroup1/>
        </source>
        <node-list>
            <node ip=192.168.1.2/>
            <node ip=192.168.1.3/>
        </node-list>
        <filter type="subtree">
            <top xmlns="http://example.com/schema/1.2/config">
                <interfaces>
                    <interface>
                        <ifName>eth0</ifName>
                    </interface>
                </interfaces>
            </top>
        </filter>
    </get-config>
</rpc>
```

The following table illustrates an exemplary NETCONF message using <node-reply> elements to provide information for a plurality of nodes.

```
<rpc-reply message-id="101"
    xmlns="urn:ietf:params:xml:ns:netconf:base:1.0">
  <data>
    <top xmlns="http://example.com/schema/1.2/stats">
      <node-reply ip=192.168.1.2>
        <interfaces>
          <interface>
            <ifName>eth0</ifName>
            <ifInOctets>75666</ifInOctets>
            <ifOutOctets>190034</ifOutOctets>
          </interface>
        </interfaces>
      </node-reply>
      <node-reply ip=192.168.1.3>
        <interfaces>
          <interface>
            <ifName>eth0</ifName>
            <ifInOctets>9677</ifInOctets>
            <ifOutOctets>107088</ifOutOctets>
          </interface>
        </interfaces>
      </node-reply>
    </top>
  </data>
</rpc-reply>
```

Figure 4:
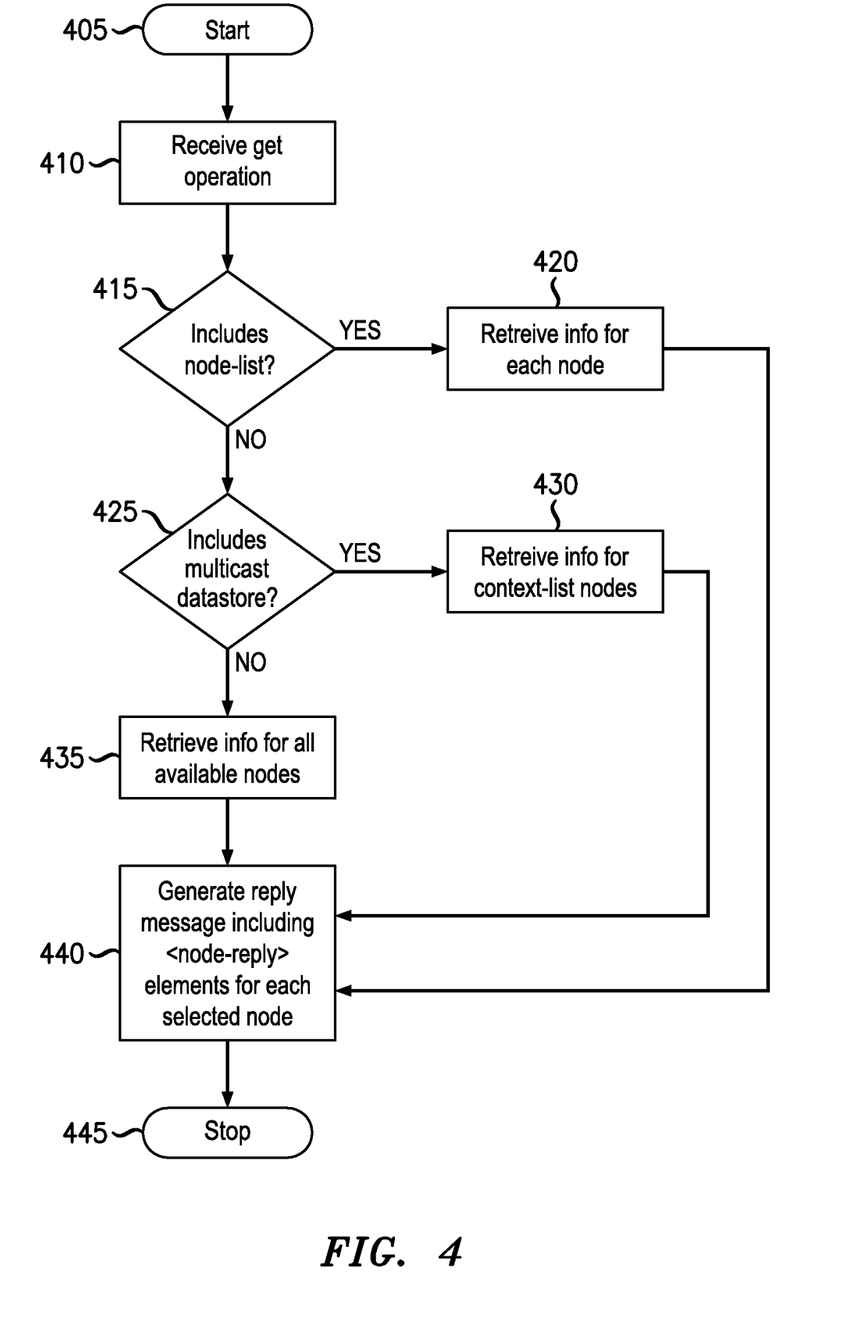
FIG. 4 illustrates a flowchart showing an exemplary method of answering a multicast request for information.

FIG. 4 illustrates a flowchart showing an exemplary method 400 of answering a multicast request for information. The method 400 may be performed by NSG 320. The method 400 may begin at step 405 and proceed to step 410.

In step 410, NSG 320 may receive a get operation requesting information regarding a plurality of nodes such as SNMP agents 330. The get operation may include standard NETCONF messages that have been extended to provide multicast capabilities. For example, the get operation may include a <get> operation or a <get-config> operation. The get operation may also include any other message requesting information from a plurality of nodes.

In step 415, NSG 320 may determine whether the received get operation includes a node-list. The node-list may be any listing of specific nodes such as the <node-list> element discussed above. If the operation includes a node-list, the method 400 may proceed to step 420. If the operation does not include a node-list, the method 400 may proceed to step 425.

In step 420, the NSG 320 may retrieve information requested for each node on the node-list. The information may be retrieved from datastores internal to the NSG 320 as well as from the node itself. To retrieve information from a node such as an SNMP agent 330, the NSG 320 may generate an SNMP message, send the message to the SNMP agent 330, and receive a response from the SNMP agent. NSG 320 may then decode the SNMP response and extract the requested information. If the information is stored locally in a datastore at the NSG 320, such as the candidate datastore 340 or the multicast datastore 350, the NSG 320 may query the appropriate datastore for the requested information. The method 400 may then proceed to step 440.

In step 425, the NSG 320 may determine whether the get operation includes a reference to a multicast datastore 350. For example, the get operation may identify one or more multicast datastores 350 as the <source> datastore. If the get operation includes a multicast datastore, the method 400 may proceed to step 430. If the get operation does not include a multicast datastore, the method 400 may proceed to step 435.

In step 430, the NSG 320 may retrieve information requested for each node on the context-list of the multicast datastore. The NSG may access the multicast-control datastore 360 to determine the nodes. As described above regarding step 420, the NSG 320 may retrieve the requested information from local datastores and by sending SNMP messages to the listed nodes. The method 400 may then proceed to step 440.

In step 435, the NSG 320 may retrieve information requested for all available nodes. Step 435 may occur, for example, in response to a get operation on the running datastore and may be used to provide as much information as possible about the configuration of NSG 320 and SNMP agents 330. The NSG 320 may access the multicast-control datastore 360 to determine all nodes associated with the NSG 320. As described above regarding steps 420 and 430, the NSG 320 may acquire node specific information from local datastores and by sending SNMP messages to the nodes.

In step 440, the NSG 320 may generate a reply message to the NETCONF client 310. The reply message may include a <node-reply> element for each node 330 including the requested information. The NSG 320 may also apply any requested filters to the node information. Accordingly, the NETCONF client 310 or an operator thereof may be able to easily parse the reply to analyze information regarding the nodes 330. The method may then proceed to step 445, where the method 400 ends.

Figure 5:
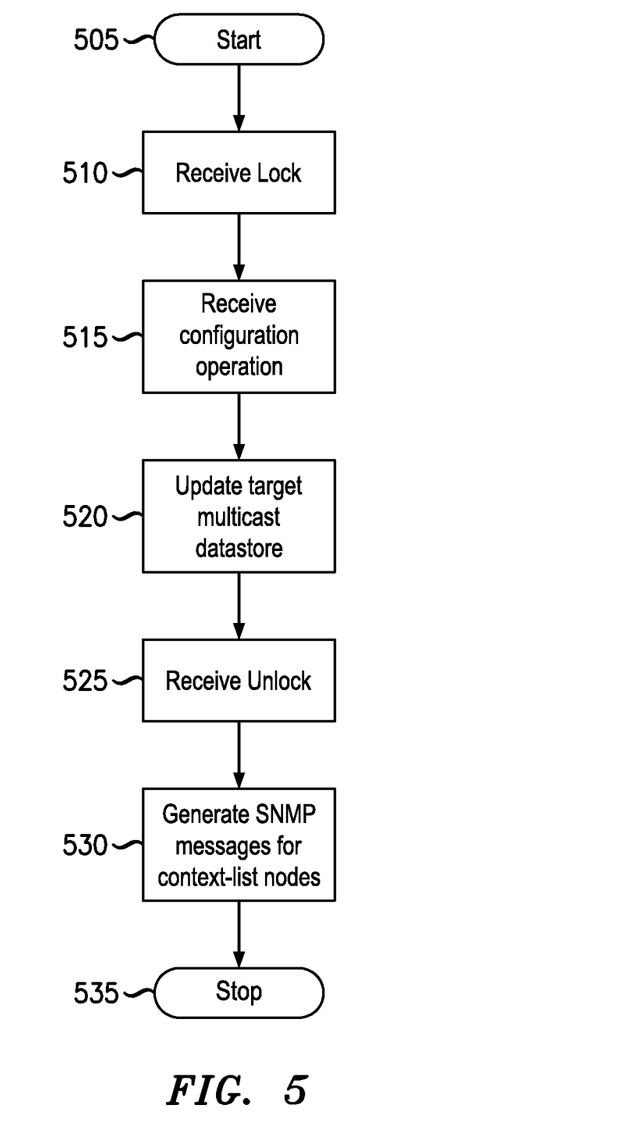
FIG. 5 illustrates a flowchart showing an exemplary method of responding to a multicast operation.

FIG. 5 illustrates a flowchart showing an exemplary method 500 of responding to a multicast operation. The method 500 may be performed by NSG 320. The method 500 may begin at step 505 and proceed to step 510.

In step 510, the NSG 320 may receive a lock operation. The lock operation may target one or more datastores on NSG 320 such as multicast datastores 350. As with standard NETCONF, the lock operation may prohibit other NETCONF clients 310 from editing the locked datastore.

In step 515, the NSG 320 may receive a configuration operation. The configuration operation may include, for example, a <edit-config>, <copy-config>, or <delete-config> operation. The configuration operation may indicate a target datastore to edit. For example, the configuration operation may identify a multicast datastore 350 as the target datastore. A configuration operation may also include any other operation that changes a datastore. The configuration operation may include edits to configuration information. For example, the configuration operation may include one or more managed objects.

In step 520, the NSG 320 may update the multicast datastore 340 for each node included in the context-list of the target datastore. The NSG 320 may add any managed objects included in the configuration operation to the appropriate candidate datastore 340. If the configuration operation includes deleting or editing a managed object, the NSG 320 may delete or edit a managed object in the candidate datastore. Steps 515 and 520 may be repeated as a NETCONF client 310 may send multiple configuration operations.

In step 525, the NSG 320 may receive an unlock operation. The unlock operation may indicate that the NETCONF client 310 has completed configuration of a multicast group.

In step 530, the NSG 320 may generate an SNMP message for each SNMP agent 330 on the context-list. The message may be an SNMP set message. As discussed above, SNMP messages may be encoded with a SNMP BER encoding. NSG 320 may generate the message by encoding any managed objects in the multicast datastore using the appropriate SNMP BER encoding. In other words, NSG 320 may translate one or more NETCONF configuration messages into a plurality of SNMP messages for different SNMP agents. NSG 320 may send the SNMP messages to the corresponding individual SNMP agents 330 based on the target IP address of each SNMP agent. The method 500 may then proceed to step 535, where the method 500 ends.

According to the foregoing, various exemplary embodiments provide for a network gateway providing translation between NETCONF and SNMP nodes. In particular, by providing a gateway that acts as a NETCONF server, a NETCONF client may be used to configure SNMP agents.

It should be apparent from the foregoing description that various exemplary embodiments of the invention may be implemented in hardware or software running on a processor. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A network configuration protocol (NETCONF) and simple network management protocol (SNMP) gateway (NSG) comprising:
a first interface configured as a NETCONF server, the first interface configured to connect to a NETCONF client and receive NETCONF messages, at least one NETCONF message identifying a managed object;
a buffer configured to store the identified managed object; and
a second interface configured to send an SNMP message to an SNMP agent, the SNMP message including the managed object stored in the buffer, wherein the buffer comprises an entry for a NETCONF datastore and the NSG is configured to clear the entry based on receipt of a lock NETCONF message.

2. The NSG of claim 1, wherein the NSG is configured to add managed objects to the entry based on receipt of a configuration NETCONF message, and send the managed objects to the SNMP agent via the second interface responsive to an unlock NETCONF message.

3. The NSG of claim 1, further comprising:
a multicast datastore configured to store a record of a multicast group including a reference to a context-list of configurable nodes.

4. The NSG of claim 3, wherein the context-list is stored in a configurable multicast-control datastore, the context-list comprising a list of addresses of the configurable nodes.

5. The NSG of claim 3, wherein the NSG is configured to receive, via the first interface, a NETCONF configuration message indicating a change to the multicast datastore, update the multicast datastore based on the configuration message, and send a plurality of SNMP messages to the configurable nodes based on the multicast datastore.

6. The NSG of claim 1, further comprising:
a candidate datastore including a candidate entry corresponding to each of a plurality configurable nodes, the NSG further configured to identify a candidate entry based on a candidate identifier and an IP address of a configurable node.

7. The NSG of claim 1, wherein the at least one NETCONF message is a get operation and the SNMP message is an SNMP get message requesting managed object information from the SNMP agent.

8. The NSG of claim 7, wherein the NSG further comprises:
a multicast datastore configured to store a record of a multicast group including a context-list of configurable nodes, wherein the SNMP get message is sent to a plurality the configurable nodes, and the NSG is further configured to send a reply message to the NETCONF client including a plurality of node-list elements including the managed object information of a respective configurable node.

9. A method performed by a network gateway, the method comprising:
receiving a NETCONF message from a NETCONF client, wherein the NETCONF message is a configuration operation including a managed object for a target datastore;
translating the NETCONF message into a SNMP message by receiving a NETCONF lock request for the target datastore and storing the managed object; and
sending the SNMP message to a configurable node.

10. The method of claim 9, wherein the NETCONF message comprises a get operation and the step of translating comprises translating the get operation into an SNMP get request, the method further comprising:
receiving an SNMP reply message including configuration information;
translating the SNMP reply message into a NETCONF reply message including the configuration information; and
sending the NETCONF reply message to the NETCONF client.

11. The method of claim 10, wherein the get operation requests a list of event streams, the method further comprising:
sending, to the NETCONF client, a list of event streams including an SNMP event stream;
receiving a NETCONF subscription request from the NETCONF client identifying the SNMP event stream;
storing a NETCONF subscription in association with the configurable node;
receiving an SNMP message from an SNMP agent on the configurable node;
translating the SNMP message to a NETCONF notification message; and
sending the NETCONF notification message to the NETCONF client.

12. The method of claim 11, further comprising:
receiving a NETCONF close session request matching a NETCONF subscription;
deleting the NETCONF subscription; and
sending a NETCONF reply.

13. The method of claim 11, wherein the list of event streams further comprises a Message Queuing Telemetry Transport (MQTT) event stream, the method further comprising:
receiving a NETCONF subscription request from the NETCONF client identifying the MQTT event stream;
storing a NETCONF subscription in association with the configurable node;
receiving an MQTT message from the configurable node;
translating the MQTT message to a NETCONF notification message; and
sending the NETCONF notification message to the NETCONF client.

14. The method of claim 9, wherein the step of translating further comprises:
receiving a NETCONF unlock request for the target datastore;
generating an SNMP set request including the managed object; and
sending the SNMP set request to the configurable SNMP agent.

15. A system comprising:
a first NETCONF client;
a first SNMP agent; and
a NETCONF SNMP gateway (NSG) configured to receive NETCONF commands identifying a managed object from the first NETCONF client, store the identified managed object in a buffer, and translate the NETCONF commands to SNMP messages, wherein the buffer comprises an entry for a NETCONF datastore and the NSG is configured to clear the entry based on receipt of a lock NETCONF message.

16. The system of claim 15, wherein the NSG comprises:
an operation buffer configured to act as a NETCONF datastore and store NETCONF operations on the NETCONF datastore received from the first NETCONF client, wherein said NSG is configured to translate the stored NETCONF operations into an SNMP message.

17. The system of claim 15, further comprising:
a plurality of SNMP agents, wherein the NSG is configured to: receive NETCONF requests; determine the desired SNMP agent; and transparently forward the translated SNMP message to the desired SNMP agent.

18. The system of claim 16, further comprising:
a plurality of SNMP agents, wherein the NSG comprises:
a multicast control datastore including a context list of IP addresses of a plurality of nodes; and
a multicast datastore, including a reference to the context list and a plurality of configuration objects that are common to the nodes in the context list, wherein the NSG is configured to: receive a NETCONF message indicating a context list; and generate an SNMP message for each node on the context list based on the configuration objects in the multicast datastore.

19. The system of claim 18, wherein the NETCONF client is configured to send a configuration request targeting the multicast control datastore and the NSG is configured to add or delete an IP address from the context list responsive to the configuration request.

20. The system of claim 18, wherein the NSG is further configured to receive a response from a plurality of the SNMP agents, and generate a NETCONF response including a plurality of node-list elements corresponding to the respective SNMP agents.

* * * * *